United States Patent [19]

Corby, Jr.

[11] Patent Number: 4,573,073
[45] Date of Patent: Feb. 25, 1986

[54] INTEGRATED LIGHTING AND CAMERA SYSTEM

[75] Inventor: Nelson R. Corby, Jr., Scotia, N.Y.

[73] Assignee: General Electric Company, Schenectady, N.Y.

[21] Appl. No.: 500,508

[22] Filed: Jun. 2, 1983

[51] Int. Cl.$^4$ ............................................... H04N 7/00
[52] U.S. Cl. ..................................... 358/96; 358/101; 358/107; 356/376; 356/381
[58] Field of Search ................ 358/93, 231, 101, 106, 358/107, 96; 356/372, 373, 376, 379, 380, 381, 385, 386, 387, 394, 398

[56] References Cited

U.S. PATENT DOCUMENTS

| | | | |
|---|---|---|---|
| 3,187,185 | 6/1965 | Milnes | 358/107 |
| 3,796,492 | 3/1974 | Cullen et al. | 358/101 |
| 4,105,925 | 8/1978 | Rossol et al. | 356/379 X |
| 4,298,286 | 11/1981 | Maxey et al. | 356/381 |
| 4,486,842 | 12/1984 | Hermann | 358/101 X |
| 4,491,719 | 1/1985 | Corby, Jr. | 350/96.24 X |

OTHER PUBLICATIONS

Computer Vision and Sensor-Based Robots, ed. by G. G. Dodd and L. Rossol, Plenum Press, New York, 1979, pp. 81–100.

Primary Examiner—Howard W. Britton
Assistant Examiner—Victor R. Kostak
Attorney, Agent, or Firm—Donald R. Campbell; James C. Davis, Jr.; Paul R. Webb, II

[57] ABSTRACT

A two-valued height-based image of an object on a support surface is acquired in one frame time of a raster scan, television-like camera. Two rotating sheets of light projected by synchronized sources intersect at the supporting surface and form a moving light bar. The image of light bars incident on a 3D object is discontinuous because of the parallax effect. The light bar illuminates and sweeps out a rectangular area in step with the electronic scan of the scene imager.

11 Claims, 18 Drawing Figures

INTEGRATED LIGHTING AND CAMERA SYSTEM

BACKGROUND OF THE INVENTION

This invention relates to a method of producing thresholded height-related images of objects and to an integrated lighting/imager system for computer vision applications.

In image processing operations for robotics, inspection, and other machine and computer vision tasks, it is often wished to develop a high contrast "shadowgram" or silhouette of a machine part lying on a plane surface such as a conveyor belt. Developing a true silhouette by using backlighting (light tables, fluorescent conveyors, etc.) is generally impractical in industrial settings and normal front lighting and simple video thresholding do not give good quality images. Too often, good contrast depends on proper background color and reflectivity, both of which are seldom optimum for all type parts in all situations. Shadows and specular reflections further confuse the scene after thresholding.

An approach that has been taken is to use structured light to form a scene description. When a sheet of light impinges on a three-dimensional surface, the light bands are distorted from their initial appearance due to their interception by the irregular surface. The prior art system in FIGS. 1a and 1b views parts on a moving conveyor, and has two fixed sheets of light intersecting in a fixed line and a line scan array to build a silhouette strip-by-strip as a precisely moving conveyor transports the part step by step through the light bar.

Figure 1A:
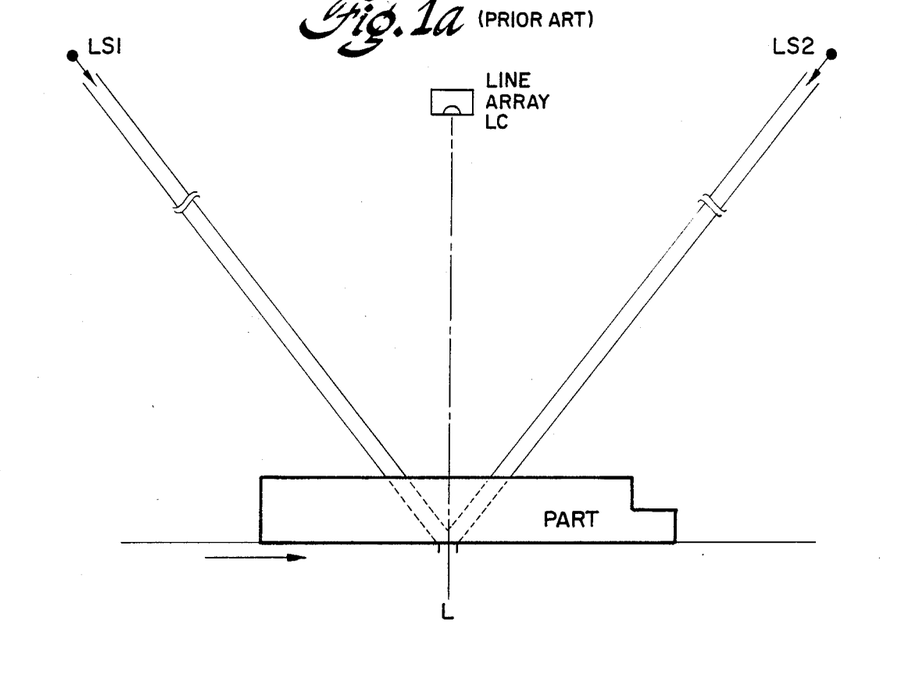
FIG. 1a shows a prior art system which employs fixed sheets of light and a one-dimensional array of sensors to produce a silhouette image of a part on a moving conveyor.
Figure 1B:
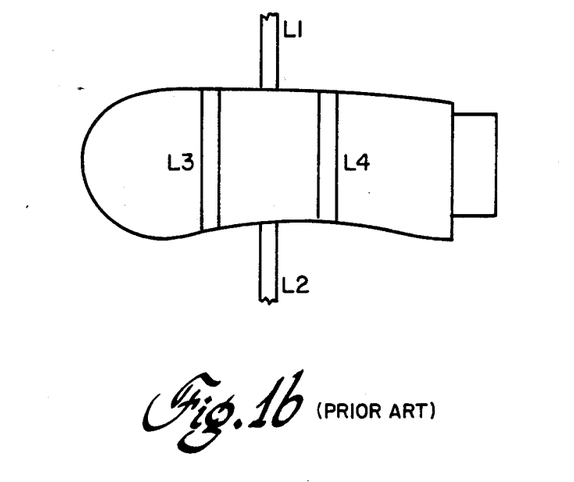
FIG. 1b is a prior art illustration of displacement of light lines by the part due to the parallax effect.

Line sources LS1 and LS2 emit sheets of light which are caused to intersect in a line L on the conveyor surface, and a one-dimensional array of photosensitive elements LC is focused along that line on the conveyor. As the conveyor causes the object to translate through the light bar/array focus line, the non-zero height of the object causes the image of the light line to break up and those portions impinging on the object are displaced left or right by an amount proportional to the height of the surface. The portion not hitting the object remains along the conveyor intersection line. Thus, line segments L1 and L2 are parts of original line L while L3 and L4 are shifted images of the left and right sheets of incident light. The line array is scanned for each object position and the process repeats. After a large number of discrete steps the object silhouette is built up.

The major drawbacks with this approach are the need for precise conveyor positioning; the need for no slippage of the object on the belt or no movement of subassemblies during "exposure"; long exposure times, as much as 5-10 seconds with normal conveyor speeds and object sizes; and the need to organize processing around a slowly produced, sequentially scanned image.

SUMMARY OF THE INVENTION

An integrated lighting and imager system includes an electronic, raster scan, television-like camera to produce a two-valued height-based image of three dimensional stationary and slowly moving objects with minimum sensitivity to surface color and finish for both the object and supporting surface. The apparatus needs only the frame time, typically 1/60 or 1/30 second, to acquire the image.

A continuous light pattern such as a light bar is projected onto the support surface or onto a plane above the surface that intersects the object, and the two-dimensional electronic imager is focused onto this plane. The image of the patterned light is discontinuous when portions of the illuminating light are incident on the object and segments of the image are displaced by an amount proportional to object height. The light pattern is moved linearly or nonlinearly along the surface to progressively illuminate a designated area in step with electronically scanning the imager and reading out image data. Thus only the area being scanned by the imager has the thin pattern of light on it.

A specific embodiment of the system comprises at least one rotating collimated line source which projects a sheet of light at an angle to a solid state television camera and forms a light bar at the support surface. Means are provided for synchronizing the camera and rotating the special light source in such a manner that the light bar progresses linearly at constant speed and illuminates a rectangular area. Movement of the light bar is coordinated with raster scanning of the camera. The image is an outline silhouette of, say, a part on a conveyor belt or table. Another embodiment utilizes a laser programmable pattern generator having a two-dimensional beam deflector to produce and rotate a sheet of light. The camera scan may be varied to suit nonlinear sweeping of the light bar.

DETAILED DESCRIPTION OF THE INVENTION

Figure 2:
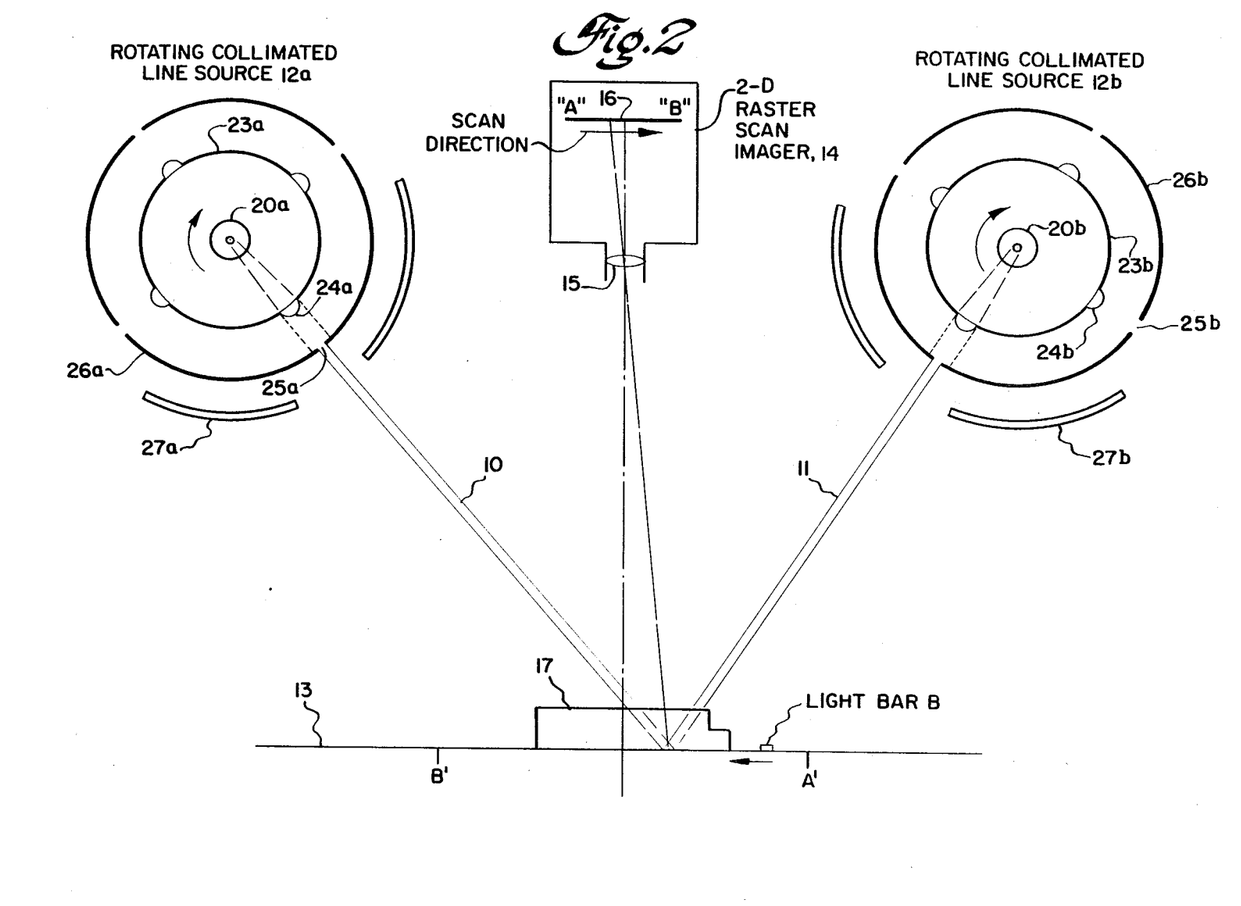
FIG. 2 is a system diagram of one embodiment of the improved integrated lighting/camera system for viewing objects.

The improved system in FIG. 2 exploits the type of illumination mentioned above, but without the penalties. The system uses a two-dimensional raster-scan imager such as a solid state television camera and two special light sources. Two rotating, collimated sheets of light 10 and 11 are emitted from the synchronized line sources 12a and 12b. The average rotational speed of light sources 12a and 12b is the same, but their speed is instantaneously varied to cause the light bar B of their intersection to progress at constant speed from A' to B' on the supporting surface 13. This bar B of light sweeps from A' to B' in T seconds, where T is the frame or field scan time of a two-dimensional raster-scan imager 14. Details of the imager are not illustrated except for the lens 15 and a line designating the imager focal plane 16. The camera plane of focus is at the support surface 13, typically a conveyor or table. Light bar B illuminates ans sweeps out a rectangular area in step with the electronic scan of the scene imager 14 on the imager focal plane 16, from A″ to B″. Thus only the area being scanned by the camera 14 has the thin, one raster line width, bar of light on it.

Figure 3:
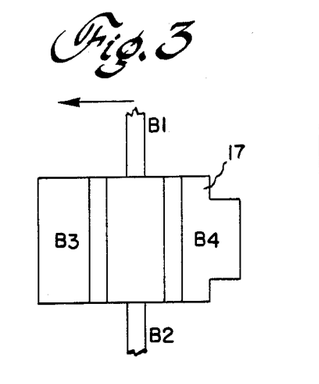
FIG. 3 is a plan view of the object and moving light bar and height displaced segments.

An object 17 and the discontinuous image of the moving light bar, as seen by the camera, is shown in FIG. 3. When the light sheets 10 and 11 impinge on a three-dimensional object, the image of the light bar breaks up and those portions incident on the object are displaced by an amount proportional to object height. The portion of the light sheets not hitting the object remains along the support surface intersecting line. Light bar segments B1 and B2 are parts of the original light bar, and segments B3 and B4 are the shifted images of the light sheets 10 and 11.

Figure 4:
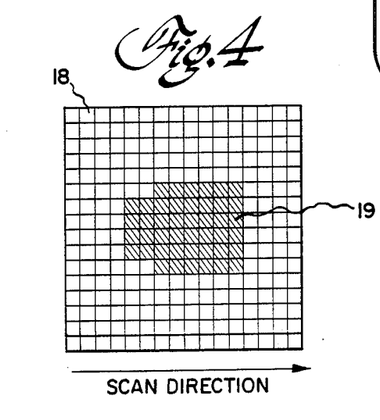
FIG. 4 shows a matrix of camera pixels and the pattern of on and off pixels corresponding to the silhouette of the object.

One suitable television-type imager is General Electric's TN2500 Charge Injection Device (CID) Camera, which has a light sensitive element with 256×256 pixels and is slightly modified to inject charge when not being read. Referring to the representation of photosensitive element 18 in FIG. 4, all of the camera pixels in a column sense light and are on when neither of the light sheets is interrupted by the object and a continuous light bar B is created at their intersection on the support surface. For the situation depicted in FIG. 3 where the light bar image is discontinuous because of interruption of light by the object, some of the pixels in that column are on and others do not sense light and are off. An outline silhouette 19 of the object is built up progressively, line by line, as the light bar is moved along the support surface. The imager is electrically scanned and image data in the form of electrical signals is read out line by line and sent to a memory. This is a two-valued height-based image as will be elaborated on later. Television-like imagers such as CID and CCD cameras commonly operate at 30 or 60 frames per second and the frame or field scan time is respectively 1/30 and 1/60 seconds. This corresponds to the time it takes light bar B to move between points A′ and B′ on the support surface, which is stationary or very slowing moving.

Figure 5:
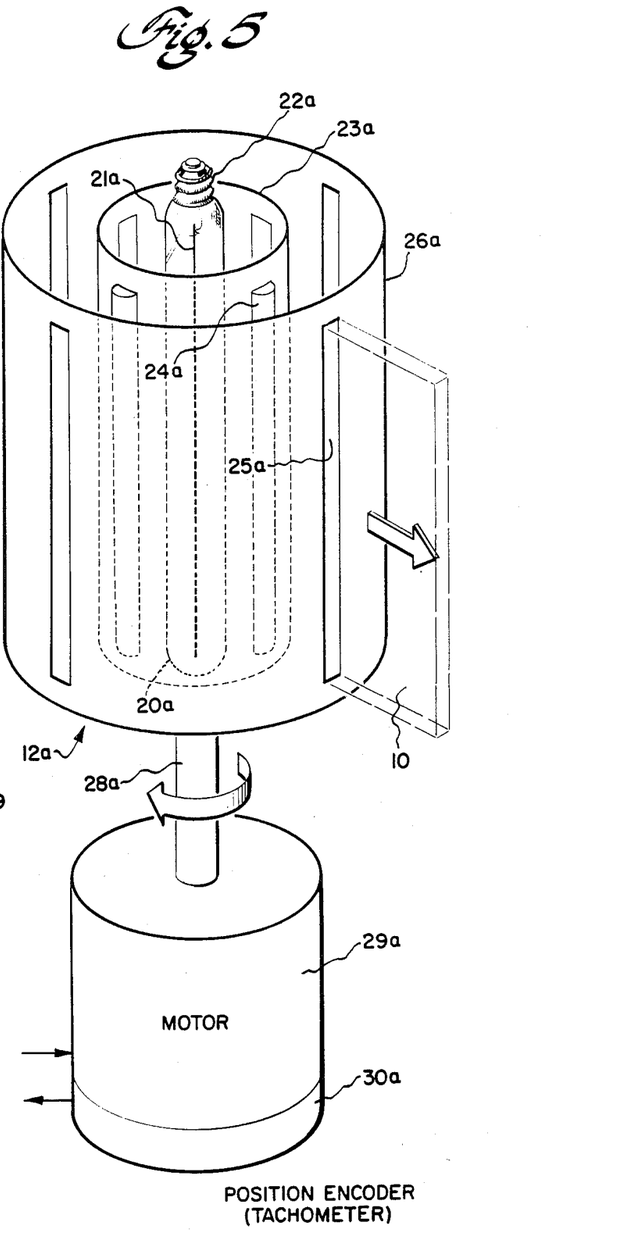
FIG. 5 is a perspective view of a rotating collimated light source and drive motor.

One configuration of the rotating collimated line source is shown in FIGS. 5 and 2. Light source 12a is described and corresponding components of the other source are identified by the same numbers with a "b" suffix. A line light source is provided for instance by a long lamp 20a which has a central filament 21a and a socket 22a. A first metal cylinder 23a surrounds the lamp and, at four equal spacings, cylindrical collimating lenses 24a are fitted into slots in the cylinder. These lenses each form a collimated sheet of light. Slots 25a are placed in a second metal cylinder 26a, radially opposite to each cylindrical lens 24a, to limit the beam width of the sheet. The radius of the first cylinder is set equal to the focal length of the lens. A thin collimated light sheet of constant brightness is projected onto the support surface 13. A third complete or partial outer cylinder is a fixed field stop 27a and has a central opening to limit the sheet angle to the range $\theta_1$ to $\theta_2$; both light sheets 10 and 11 are projected onto surface 13 between A′ and B′ and are blocked at other points.

The first and second cylinders 23a and 26a rotate as a unit, and line light source 20a can be fixed or rotating. There are four groups of lenses 24a and slots 25a per cylinder, but there may be fewer or more lens-slot groups than this. Let it be assumed that camera 14 has a frame scan time, T, of 1/30 second. If there are N lens-slot groups per cylinder, the average rotational speed is $S = 1800/N$ rpm and period of rotation $T_R = N/30$ second. A good choice is $N = 4$.

The light source assembly is coaxial with the shaft 28a of an electric motor 29a. A conventional position encoder 30a develops an electrical signal representing the angular position of the light source and drive motor. An encoder/tachometer or separate tachometer may be provided if a velocity feedback signal is needed.

Figure 6:
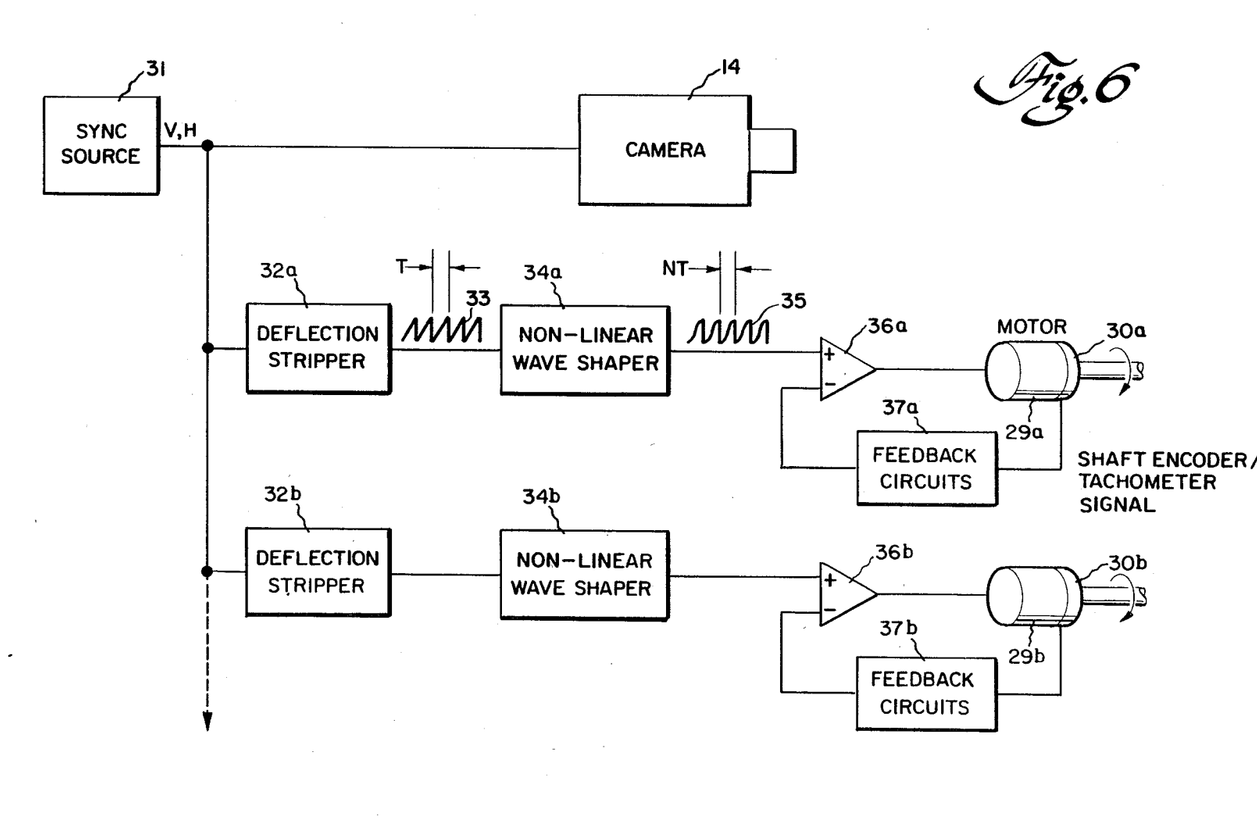
FIG. 6 is a block diagram of the camera and light source motor control circuitry.

The system block diagram in FIG. 6 explains the operation of the system. Initially (see FIG. 2) light sheet 10 from line source 12a and light sheet 11 from line source 12b are positioned at A′ as is the raster-scan beam on the camera's focal plane. A synchronizing source 31 drives the camera 14 as well as the motor drive circuits for line sources 12a and 12b. This source generates vertical and horizontal sync pulses, typically one vertical pulse and 256 horizontal pulses, and so on. A vertical deflection module or deflection stripper circuit 32a creates a vertical reference signal 33 similar to the one produced by the camera. This is a sawtooth waveform which has a period the same as the camera's frame scan time. Due to the nonlinear relation of sheet translation speed to light source rotation, i.e., that beam position is proportional to $\tan \theta$, the deflection reference signal is passed through a nonlinear wave shaper 34a. The transfer function of this nonlinear function module is such that the resulting motor drive signal moves light bar B along the support surface 13 at constant speed. The nontriangular, periodic waveform 35 with period NT is used to drive a closed loop feedback servo loop driving the light source motor 29a, whose speed is instantaneously varied. The command or input position voltage 35 is fed to a differential amplifier 36a, the other input to which is a feedback voltage from the shaft encoder 30a and feedback circuitry 37a that represents the actual angular position of the light source. The output of the differential power amplifier is the error signal and is the drive voltage to motor 29a. The drive circuit for motor 29b is the same except that there is a fixed phase delay between the two light sources. If there are other rotating collimated light sources, the motor control circuitry is similar.

An alternative is to run the motors at constant speed and scan the television camera at a varying rate. The sweep rate of the rotating sheet of light is constant in this case. The bar progresses at a nonlinear speed along the support surface and read out of the camera is varied to suit.

Figure 7A:
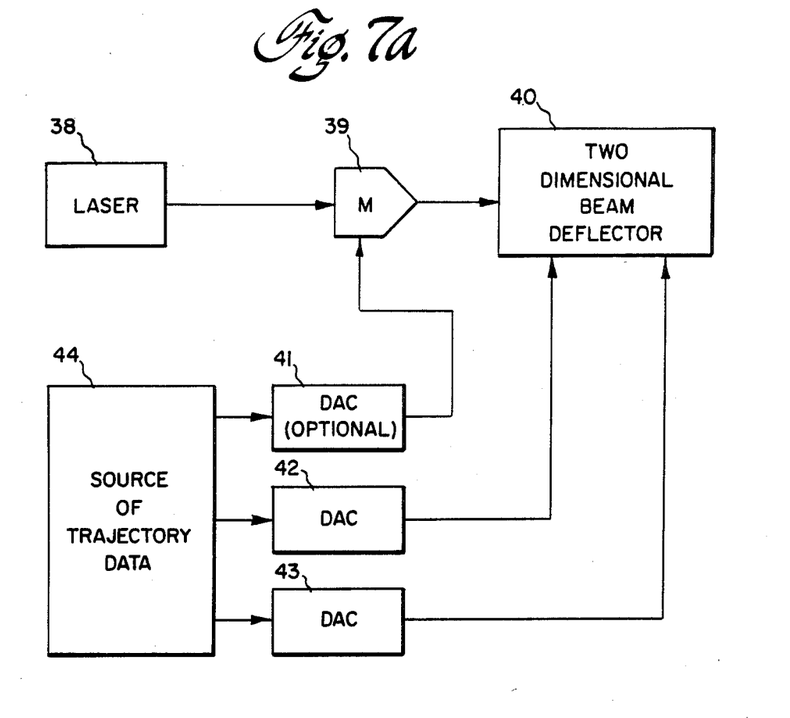
FIG. 7a is a block diagram of a laser programmable pattern generator and FIG. 7b is a sketch of the beam deflector to rotate the sheet of light.
Figure 7B:
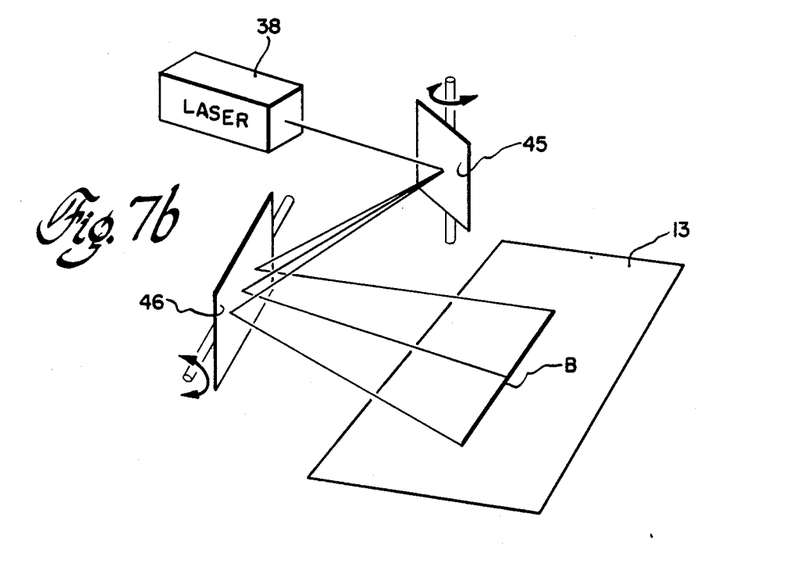
Figure 8:
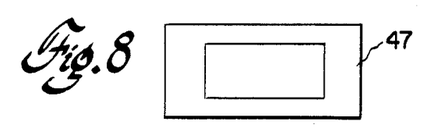
FIG. 8 is a plan view of a part.

Among the other ways of producing a rotating sheet of light is by the laser programmable pattern generator in the inventor's copending application Ser. No. 451,219 filed on Dec. 20, 1982, now U.S. Pat. No. 4,491,719, and assigned to the same assignee. Referring to FIG. 7a, a laser 38 forms a narrow beam that is optionally passed through a beam intensity modulator 39 and then into a two-dimensional beam deflector 40. The deflection system and the modulator are driven by the outputs of digital-to-analog converters 41-43 which in turn are supplied with data by a source of trajectory data 44. The deflector can be a pair of rotatable mirrors 45 and 46 as shown diagrammatically in FIG. 7b, each driven by a precision galvanometer mechanism (such as the Type ALS-PS Scanner in an X-Y Mount sold by Frequency Control Products, Inc.). The first mirror 45 scans the beam along a line on the surface of the second mirror 46. The second mirror rotates to sweep the sheet of light at a known linear or nonlinear rate along the surface 13.

Figure 9A:
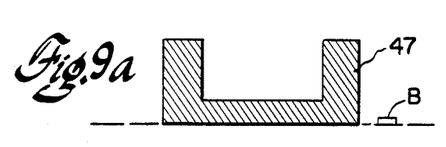
FIGS. 9a-9d are vertical cross sections through this part showing the plane of camera focus and light sheet intersection at different locations.
Figure 9B:
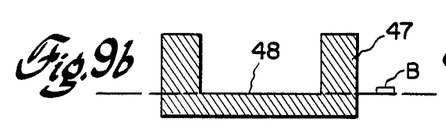

The image generated by the integrated lighting and camera system is a two-valued height-based image. The plane of interest may be at other locations than at the support surface, providing it intersects the object. FIG. 8 and FIGS. 9a–9d show a bathtub shaped part 47. In FIG. 9a, as in FIG. 2, light bar B is formed at the support surface by the intersection of the two sheets of light, and the image seen in FIG. 9e is an outline silhouette, black in the center with dimensions corresponding to the dimensions of the bottom of the part, and white in other areas. In FIG. 9b the plane of interest indicated by the dashed line is at the bottom inside surface 48 of the part, where the light sheets cross and illumination bar B is formed. The image, FIG. 9f, has a white rectangle corresponding to the dimensions of surface 48 and a black border. This type of image is useful where, for instance, an expandable gripper is to be lowered into the part to pick it up.

Figure 9C:
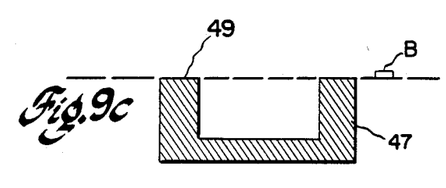
Figure 9D:
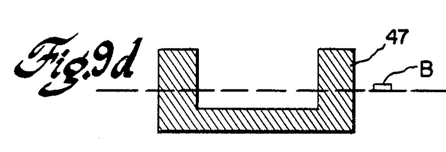
Figure 9E:
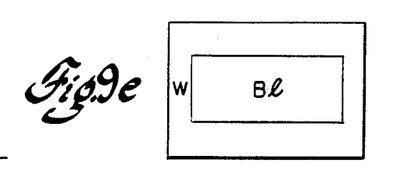
FIGS. 9e-9h are the respective two-valued height-based images.
Figure 9F:
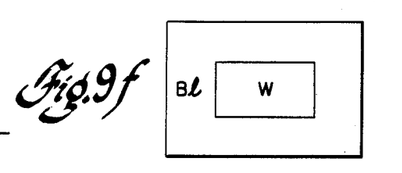
Figure 9G:
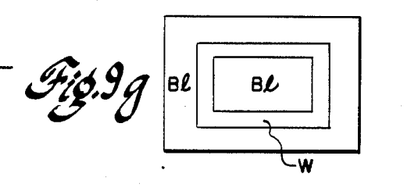
Figure 9H:
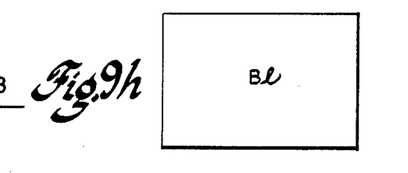

In FIG. 9c the plane of focus of the camera and the plane at which the light sheets intersect and light bar B is formed, is at the top surface of the part. This image, FIG. 9g, has a black interior rectangle surrounded by a four-sided white area (top surface 49) and a black border. This image is desired if, for example, adhesive is to be applied to the top of the part. The situation depicted in FIG. 9d is avoided because it gives no information about the part. The plane along which light bar B is translated is midway up the sides of the part. The light reflected and picked up by the camera is displaced at all places, and the image in FIG. 9h is black everywhere.

The television-like imager produces thresholded height-related images of three dimensional, stationary or very slowly moving parts with minimum sensitivity to surface color and finish for the part and support surface. The system is most suitable for viewing stationary objects, but it is permissable if there is a negligible amount of movement in one imager frame scan time, e.g., 30 inches per second for T=1/30 second. The integrated lighting/camera system has utility in automatic assembly and inspection, robotics, and various computer vision applications. The structured light pattern projected by the light source, instead of a thin continuous bar, can have other geometries. There may be one light source but two line sources 12a and 12b are normally used and mitigate the shadowing effect.

While the invention has been particularly shown and described with reference to preferred embodiments thereof, it will be understood by those skilled in the art that various changes in form and details may be made therein without departing from the spirit and scope of the invention.

The invention claimed is:

1. An integrated lighting and camera system for producing a two-valued height-based image of an object on a support surface comprising:
   a two-dimensional, raster scan camera focused onto a plane at or above said surface intersecting said object;
   means for projecting at least one sheet of light at an angle to said camera and forming a light bar at said plane, the image of said light bar being discontinuous when a portion of said light sheet impinges on said object and image segments are displaced by an amount dependent on object height;
   means for rotating said sheet of light and moving said light bar at a known speed along said plane and illuminating a rectangular area; and
   means for synchronizing said projecting means and camera such that progression of said light bar is in step with electronic scanning of said camera and reading out image data;
   wherein said light sheet projecting and rotating means is a laser pattern generator having a two-dimensional beam deflector.

2. An integrated lighting and camera system for producing a two-valued height-based image of an object on a surface comprising:
   a two-dimensional, raster scan imager focused onto a plane at or above said surface intersecting said object;
   a pair of rotating collimated light sources on opposite sides of said imager which project sheets of light that intersect at said plane and form a light bar, the image of said light bar being discontinuous when portions of said light sheets impinge on said object and image segments are displaced by an amount dependent on object height;
   means for rotating said light sources and moving said light bar along said plane and illuminating a rectangular area; and
   means for synchronizing said light sources and imager such that progression of said light bar is in step with electronic scanning of said imager and reading out image data;
   wherein each light source is comprised of a line illumination source, a first cylinder having at least one cylindrical collimating lens, a second cylinder having at least one radially opposite slot to limit the beam width of the sheet of light, and a fixed field stop.

3. An integrated lighting and camera system for producing a two-valued height-based image of an object on a surface comprising:
   a two-dimensional, raster scan imager focused onto a plane at or above said surface intersecting said object;
   a pair of rotating collimated light sources on opposite sides of said imager which project sheets of light that intersect at said plane and form a light bar, the image of said light bar being discontinuous when portions of said light sheets impinge on said object and image segments are displaced by an amount dependent on object height;
   means for rotating said light sources and moving said light bar along said plane and illuminating a rectangular area; and
   means for synchronizing said light sources and imager such that progression of said light bar is in step with electronic scanning of said imager and reading out image data;
   wherein said rotating means comprises a separately controlled motor for each light source whose speed is instantaneously varied; and
   said synchronizing means includes a sync source which sends sync pulses to said imager and to motor drive circuitry, the latter having means for creating a vertical reference sawtooth signal like that of the imager, and a nonlinear wave shaper to provide a motor drive voltage such that said light bar progresses at constant speed.

4. A method of rapidly producing a silhouette image of an object on a support surface comprising:
- focusing a two-dimensional television-type camera onto said surface;
- projecting sheets of light at an angle to said camera that intersect at said surface and form a light bar whose image is discontinuous when said light sheets impinge on said object and image segments are displaced by an amount proportional to object height;
- rotating said light sheets in synchronism and causing said light bar to progress at a known speed and sweep out and illuminate a rectangular area in a time period equal to the camera frame scan time; and
- electronically, raster scanning said camera and reading out image data in step with the progression of said light bar.

5. The method of claim 4 wherein said light bar is relatively thin and approximately one camera raster line wide.

6. The method of claim 4 wherein said object is stationary or moves a negligible amount in one camera frame scan time.

7. A method of rapidly producing a two-valued height-based image of an object comprising:
- focusing a two-dimensional, raster scan electronic imager onto a plane that intersects said object;
- projecting a continuous light pattern onto said plane, the image of said light pattern being discontinuous when light is incident on said object and image segments are displaced by an amount depending on object height; and
- moving said light pattern along said plane to progressively illuminate a designated area in a time period equal to one frame scan time of said imager and in step with electronically scanning said imager and reading out image data.

8. The method of claim 7 wherein said light pattern is a thin bar created by projecting at least one sheet of light onto said plane.

9. The method of claim 7 wherein said light pattern progresses at substantially constant speed along said plane.

10. The method of claim 7 wherein said light pattern progresses at a nonlinear rate along said plane and scanning of said imager is varied to suit.

11. The method of claim 7 wherein said plane is at a surface on which said object is supported and the image is an outline silhouette of said object.

* * * * *